July 13, 1937.                J. JACOBSON                2,086,556
PROJECTION SCREEN FOR OBTAINING STEREOSCOPIC EFFECTS
Filed Jan. 11, 1934
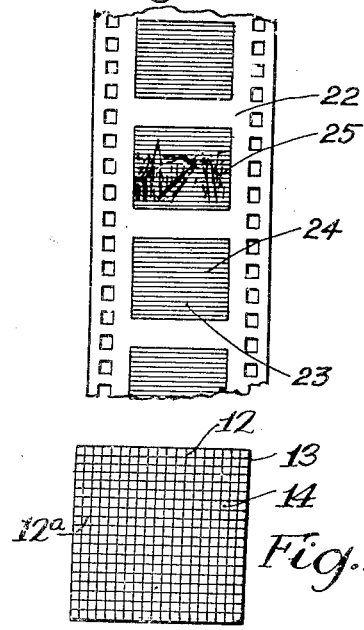
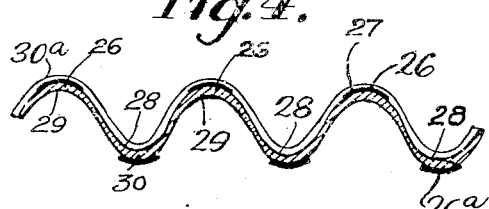
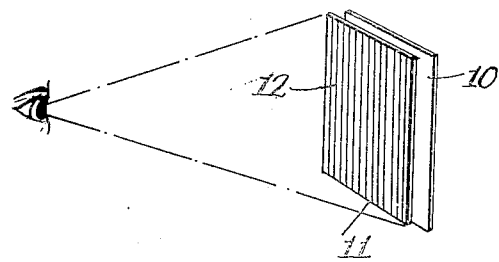
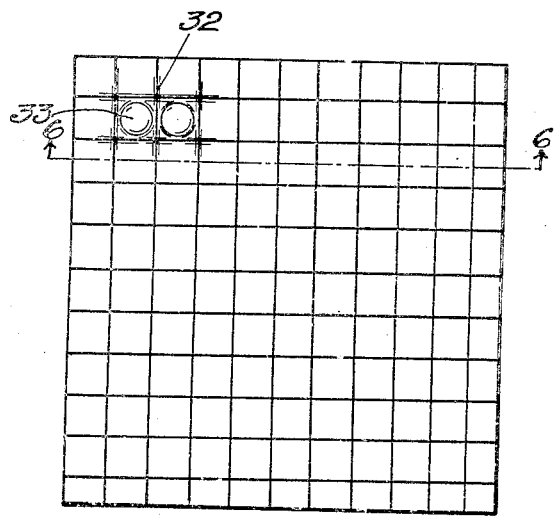
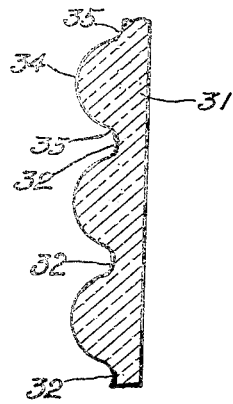
INVENTOR
John Jacobson
BY
ATTORNEY Patented July 13, 1937

2,086,556

UNITED STATES PATENT OFFICE 2,086,556

PROJECTION SCREEN FOR OBTAINING STEREOSCOPIC EFFECTS

John Jacobson, New York, N. Y.; Beatrice Jacobson administratrix of said John Jacobson, deceased Application January 11, 1934, Serial No. 706,209

5 Claims. (Cl. 88—24)

This invention relates to a projecting screen for obtaining stereoscopic effects, and has for its object a simple, cheap and effective screen for producing stereoscopic pictures, such as photographs, transparencies and the like.

An object is to produce an improved projection screen for use in connection with obtaining stereoscopic effects.

In the accompanying drawing:

Figure 1 is a diagram illustrating how a transparency and screen may be combined to produce a stereoscopic effect;

Figure 2 is a diagram illustrating the construction of a modification of the screen shown in Figure 1;

Figure 3 is a diagram of a photograph used with the herein described projection screen;

Figure 4 is a sectional diagram of a ribbed screen constructed according to this invention;

Figure 5 is a diagram of a lenticular screen that may be used in applying this invention; and Figure 6 is a cross sectional view on the line 6—6 of the screen, Figure 5.

Referring to Figure 1, if an ordinary transparent photograph or transparency 10 is placed immediately behind a screen 11 and viewed through the screen, a stereoscopic effect will be obtained.

The screen 11 may be made in any suitable manner of glass, gelatin or cellulose material, and may be flat, or ribbed as hereinafter described. If ribbed it may have vertical ribs only, or may be ribbed horizontally, as well.

If a flat transparent screen 11 is used, it may consist of a piece of glass having thereon a plurality of transparent colored vertical lines 12. About forty-ight lines to the inch is correct for direct vision as shown in Figure 1 and these lines are 1/48" wide and of alternate complementary colors, say red and green or red and blue.

Another modification is to provide a screen as shown in Figure 2, wherein the body 13 of the screen is of one color and the dots 14 the complementary color. The spacings of the lines 12, 12a are about twenty-four to the inch. The dots may be lenticular in form as hereinafter described. The dots 14 are formed by the intersection of the lines 12, 12a. The body is therefore composed of the area covered by the lines and may be colored red. The dots or spaces between the lines may be colored green. If desired the dots may be on one side of the plate or two plates,—one with dots and the other with the body color can be used.

If ribbed screens are desired in any of the preceding types they may be made in accordance with the description hereinafter given. The best type of screen for a given picture depends upon the character of the picture and the degree of three dimensional effect desired, and can best be determined by experiment in each case.

The foregoing applies to direct vision only, where for example the picture is hung in a window and viewed against the light in order to obtain a stereoscopic effect. When such arrangements are used it is obvious that the picture is not projected. This direct vision stereoscopic effect is, however, enhanced by using a double picture as is well known in the art.

It is preferable to have the photograph to be projected ruled with a series of parallel equally spaced horizontal lines as shown in Figure 3 wherein the numeral 22 denotes, for example, a standard motion picture film with a space 23 on which the picture is located. The horizontal lines 24, say two hundred to the inch, may be placed on the film in any suitable manner. One method is to expose the film photographically to a ruled surface having black lines engraved thereon. This is hereinafter termed "pre-exposing" the film.

The pre-exposed film is then exposed in a camera and the picture 25 superimposed over the lines aforesaid.

A negative made as just described when developed will show the picture 25 in the ordinary manner, the lines 24 being practically invisible to direct vision except under magnification.

The exposed and developed film may now be used from which to make positive prints in the ordinary manner and these positive prints will of course have a series of white lines crossing the picture corresponding to the lines caused by pre-exposing the negative.

The positive film may now be placed in an ordinary picture projector and the pictures projected. If an ordinary screen is used, no particular difference will be noted in the projected image, except if the picture was made doubled as referred to it will look blurred in the foreground.

For stereoscopic front projection a screen can be used containing twenty-four vertical lines to the inch, $\frac{1}{24}$" wide, of one color—say red. A preferable arrangement, however, is a screen made of any suitable material containing approximately forty-eight vertical lines to the inch, said lines being alternately red and green or red and blue so that the entire surface of the screen is composed of alternate stripes of color. It will be understood that any suitable complementary colors may be used for the stripes.

An alternate form of screen may be made of gelatin or cellulose suitably formed to be grooved in alternate ribs and troughs. Such a screen is shown in cross section, Figure 4, in which the outer ribs are indicated at 26 and these may be colored red on the outer surface 27. The troughs are indicated at 28. The colors on the opposite side are indicated at 26a and the aluminum coating is indicated at 30a.

The cellulose material is so gaged that the back surface dries down below the ribs, thus producing grooves and ribs on both sides, the material being slightly thickened at the points indicated at 29, 30 on each side. When stripped from the mold, one surface is inked with one color, say red, with an ordinary printing roller so that the raised ribs on that side take on the color in an even width of line which will be evenly spaced. After drying, the sheet is turned over and the other side inked with a color complementary to the first color applied. One side when dried is then sprayed or painted over with aluminum paint and as the colors used are transparent a bright metallic alternating red-green or red-blue screen results, which is monochromatic, the lines being indistinguishable as such due to the number per inch and evenness of same when viewed from the ordinary distance by the observer at which such screens are used.

Another method of making the screen is to spray ordinary paint, the aluminum paint first and the color afterwards. In this latter case the ridges are coated with tallow or varnish or other resistant and the screen is sprayed with one color. The resistant is then washed off and the bare ridges coated with the complementary color.

A further method of making the screen is to put up a sheet of aluminum screen cloth, placing a mask of flat metal strands in front of it and spraying on one color through the mask, allowing the screen to dry and then shifting the mask the width of one of said strands thereby covering the lines already produced by the first coloring and then spraying the screen with the complementary color. When the mask is removed the result is an even monochromatic screen which, if the red-green combination is used, appears at viewing distance to be light brown, or if the red-blue combination is used, a light purple.

For rear projection screens, the aluminum coating is not used and instead a thin coating of white may be sprayed over the colored stripes to insure evenness of tone, this white coating forming the picture receiving surface. In this form of screen refraction aids in securing the stereoscopic effect.

As the eyes have about 30,000,000 sensing fibrils, when a picture made as previously described is projected on any one of the aforesaid screens, half the number of fibrils sees one color or one section of the picture and the other half of the fibrils the other half of the same picture. The horizontal stripes on the film or picture enable added light to reach the vertical stripes on the screen, thereby apparently increasing the peculiar optical effect produced which effect is enhanced by reason of the step employed in the method of taking the picture with a lens that spreads the parallax base, thereby obtaining a doubling effect which is merged into a single picture by reason of the vertical stripes of color on the screen.

The blacks of the picture are opened up by reason of the horizontal lines across the film. This enables more light to reach the vertical colored lines on the screen. Where molded or formed screens are employed as shown in Figure 4, it is desirable that at least the top of the ridges form a sine curve and that the body of the screen be made of clear material in order to take advantage of refraction which aids in obtaining the third dimensional effect.

A projecting screen for receiving the image of the projected picture as described, having a corrugated or lined surface with complementary colors alternately spaced on the corrugations, provides a comparatively inexpensive method of applying the invention and secures a uniform surface for the picture. No change or color screen, in this case, is required in the projector itself, and no change is required in the picture subject except the introduction of the effect of stereoscopic relief in photographing the picture.

In Figure 5 is shown a form of screen in which a lenticular surface is obtained. Here the screen 31 may be made of light sensitive gelatin, the lines 32 being photographed thereon. This process leaves the gelatin not exposed to the light, relatively absorbent. This is the portion between the lines 32. The screen is then exposed and immersed in a suitable dye which is absorbed by the spaces 33 between the lines; the gelatin in these spaces swells, causing a plurality of lenses to be formed round at their tops 34 and tapering to the base 35, as shown in Figure 6. The tops 34 of the lenses are now coated with a color complementary to the color first applied to the screen. This screen is particularly adapted to rear projection.

The stereoscopic effect herein described and claimed is largely based on the law of simultaneous contrasts. The color sensory fibrils of the eye can only sense one color at any given instant, being blind at this instant to the complementary color. As the fibril tires, it becomes capable of sensing the complementary color and at that instant becomes blind to the color first sensed. Advantage is taken of this phenomenon in carrying out the method of obtaining stereoscopic effects herein described and claimed, and from the foregoing description, it will be evident that many variations can be made in carrying out the invention without departing from the scope of the appended claims.

It will be apparent that the stereoscopic effect can be produced by modifying the various steps in the method herein set forth. For example, if an ordinary photograph is projected on the special screens herein described, a certain effect will be produced. If a photograph with horizontal lines as shown in Figure 3 is used the effect produced will be different. If a "doubled" picture, is used, with or without the lines, Figure 3, a still different effect will result. It is therefore apparent that the steps of the process can be modified and changed in sequence without, however, departing from the scope of the appended claims.

What is claimed is:

1. A screen for receiving the image of a picture projected in stereoscopic relief comprising a flexible transparent screen having its image-receiving surface carrying vertically running and closely spaced parallel ribs and grooves on both front and back, said ribs being alternately colored in complementary colors, and said surface being sprayed with an image receiving aluminum paint.

2. A screen for pictures projected in stereoscopic relief comprising a transparent screen carrying vertically running ribs and grooves alternately on both front and back, the ribs on one side being coated with a color and the ribs on the reverse side being coated with another color complementary to the color on the first side, and a coat of aluminum paint applied to one of said sides.

3. A flexible transparent screen for receiving the image of a picture in stereoscopic relief made up of vertically running small closely spaced ridges and grooves alternating on each surface whose cross section horizontally describes a sine curve, the top of said ridges on one surface being stained in one color and the top of the ridges on the reverse surface being stained in a color complementary to the first color, and a coat of aluminum paint applied to one of the sides.

4. A flexible transparent cast screen for receiving the image of a picture in stereoscopic relief, said screen carrying vertically running small closely spaced ribs or ridges alternating on each surface, the front surface of which is coated with aluminum and coated with one color on top of the ridges and with color complementary to the first color in the grooves.

5. A screen for receiving the image of a picture in stereoscopic relief comprising an image-receiving surface carrying parallel closely spaced lines, on both front and back, which lines are alternately colored with complementary colors, and a coat of aluminum paint applied to one of said sides to give a bright monochrome tinted screen surface.

JOHN JACOBSON.